Feb. 20, 1951 H. M. BRUCKART 2,542,749

TELEPHONE INTERCEPT SYSTEM

Filed Oct. 22, 1947 2 Sheets-Sheet 1

INVENTOR.
HARRY M. BRUCKART
BY Winfred T. Powell
ATTORNEY

Feb. 20, 1951 H. M. BRUCKART 2,542,749

TELEPHONE INTERCEPT SYSTEM

Filed Oct. 22, 1947 2 Sheets-Sheet 2

INVENTOR.
HARRY M. BRUCKART

BY Winfred T. Powell

ATTORNEY

Patented Feb. 20, 1951 2,542,749

UNITED STATES PATENT OFFICE 2,542,749

TELEPHONE INTERCEPT SYSTEM

Harry M. Bruckart, Rochester, N. Y., assignor to Stromberg-Carlson Company, a corporation of New York Application October 22, 1947, Serial No. 781,294

12 Claims. (Cl. 179—27)

Figures 1, 3:
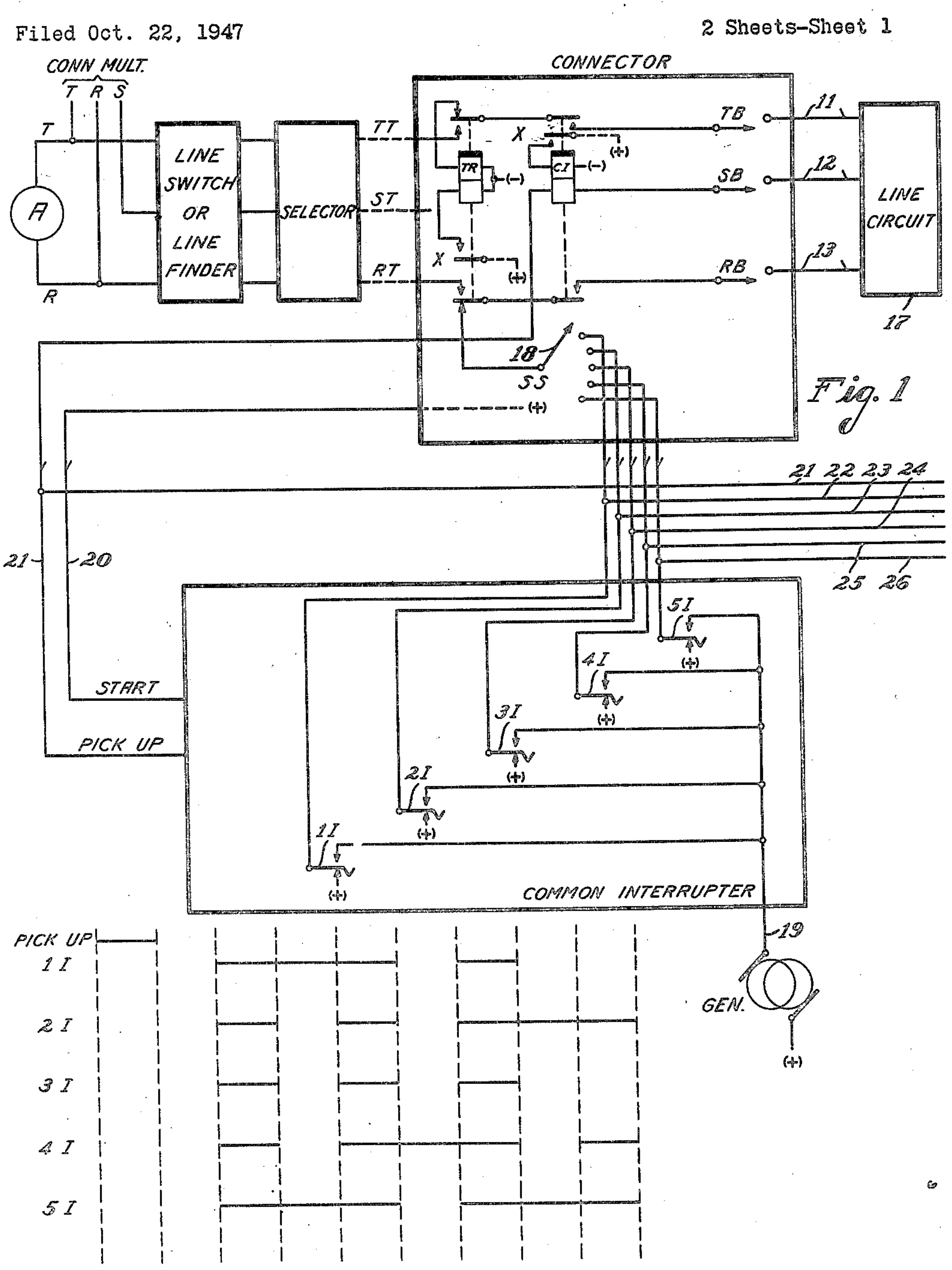

This invention relates to telephone systems and it more particularly pertains to improvements in circuits for providing call intercept service in automatic telephone systems.

In telephone systems of the character indicated, when one or more of the substations associated with a party line is taken out of service or disconnected from the line, it is desirable to provide an arrangement whereby calls intended for the disconnected substation are routed to an operator's position or special tone circuit so that the calling subscriber can be informed that the called substation is no longer in service. Call intercepting service of this type is also desirable in other instances when calls to substations actually in service are to be routed to an operator's position. It is an object of the present invention to provide, in an automatic telephone system of the character described, improved apparatus of simple and economical arrangement which operates in a new and improved manner to intercept calls to a substation associated with a party line and to route such call to an operator's position or special tone circuit.

Another object of the invention is the provision of circuit arrangements in a party line system of the code ringing type, so that the control of the call intercepting apparatus is effected through operation of a ringing relay associated with the common intercept circuit from the ringing code applied to the line from the connector or final selector switch, in conjunction with another ringing relay associated with the common intercept equipment which is operated from the common code ringing equipment by way of a cross-connection which marks the station of the line which is on intercept, that is, calls to this station are to be intercepted and extended to an operator's position or special tone circuit.

It is a further object of the invention to provide an improved circuit arrangement of the character described wherein the intercept portion of the common circuit is effective to respond to a call for a station on the line to which the intercept circuit is connected when a correspondence condition exists between the operations of the above mentioned ringing relay controlled from the connector circuit and the operations of the ringing relay controlled by way of the cross connection to the common code ringing apparatus. When such correspondence exists for all code rings of a ringing cycle, the call is extended to the intercept operator or special tone circuit. If there is an out of correspondence condition in any portion of the code ring of the ringing cycle, then the intercept circuit is cleared out and the call is not extended to the operator or special tone circuit.

It is still a further object of the invention to provide an improved arrangement of the character described wherein the automatic switching apparatus of an intercept circuit comprises a ring-up relay and a cut-in relay individually associated with the party line to which calls are to be intercepted. These individual relays are so connected and arranged that, when any one of the cut-in relays is caused to operate to extend a call to the intercepting operator's position, all of the other similar relays are disconnected from the extended start-wire arrangement, for preventing the operation of more than one cut-in relay of a group at any one time.

Further features of the invention pertain to the particular arrangement of the circuit elements whereby the above and additional features are attained.

The novel features believed to be characteristic of the invention are set forth in the appended claims. The invention, both as to its organization and method of operation, together with further objects and advantages thereof will be best understood by reference to the specification taken in connection with the accompanying drawings in which Figs. 1 and 2 taken together illustrate an intercept circuit arrangement having embodied therein the features of the invention briefly outlined above, and Fig. 3 is a timing chart illustrating the pick up pulse and the short and long rings supplied to the connector circuits by way of a pick up interrupter and ringing interrupters 1I, 2I, 3I, 4I and 5I, with the rings supplied as illustrated by the correspondingly numbered common interrupter devices.

For the purpose of simplifying the illustrations and facilitating the explanation, the various parts and circuits constituting the embodiment of the invention have been shown diagrammatically and certain conventional illustrations have been employed, the drawings having been made more with the purpose of making it easy to understand the principles and mode of operation than with the idea of illustrating the specific construction and arrangement of parts that would be actually employed in practice. Thus, the various relays and their contacts are illustrated in a conventional manner, with all of the contacts associated with a particular relay being illustrated as attached to this relay by means of a dashed line. The negative side of the common exchange battery is indicated by a minus sign in parentheses and the positive side of the exchange battery, which is usually grounded, is indicated by a plus sign in parentheses.

For convenience in illustrating and describing the features of the present invention, it is assumed that the invention is applied to a party line telephone system of the code ringing type. While only five code ringing interrupters are illustrated in Fig. 1 for applying five corresponding code rings as illustrated in Fig. 3, it will be understood that additional common code ringing interrupters may be used for applying additional codes. It will be apparent from the following description that, no matter how many codes are provided and no matter what these codes comprise in the way of number and length of ringing intervals, the correspondence arrangement of the common intercept circuit will function to extend a call for a station to be intercepted on a party line connected to the intercept circuit to the operator's circuit or special tone circuit.

Figure 2:
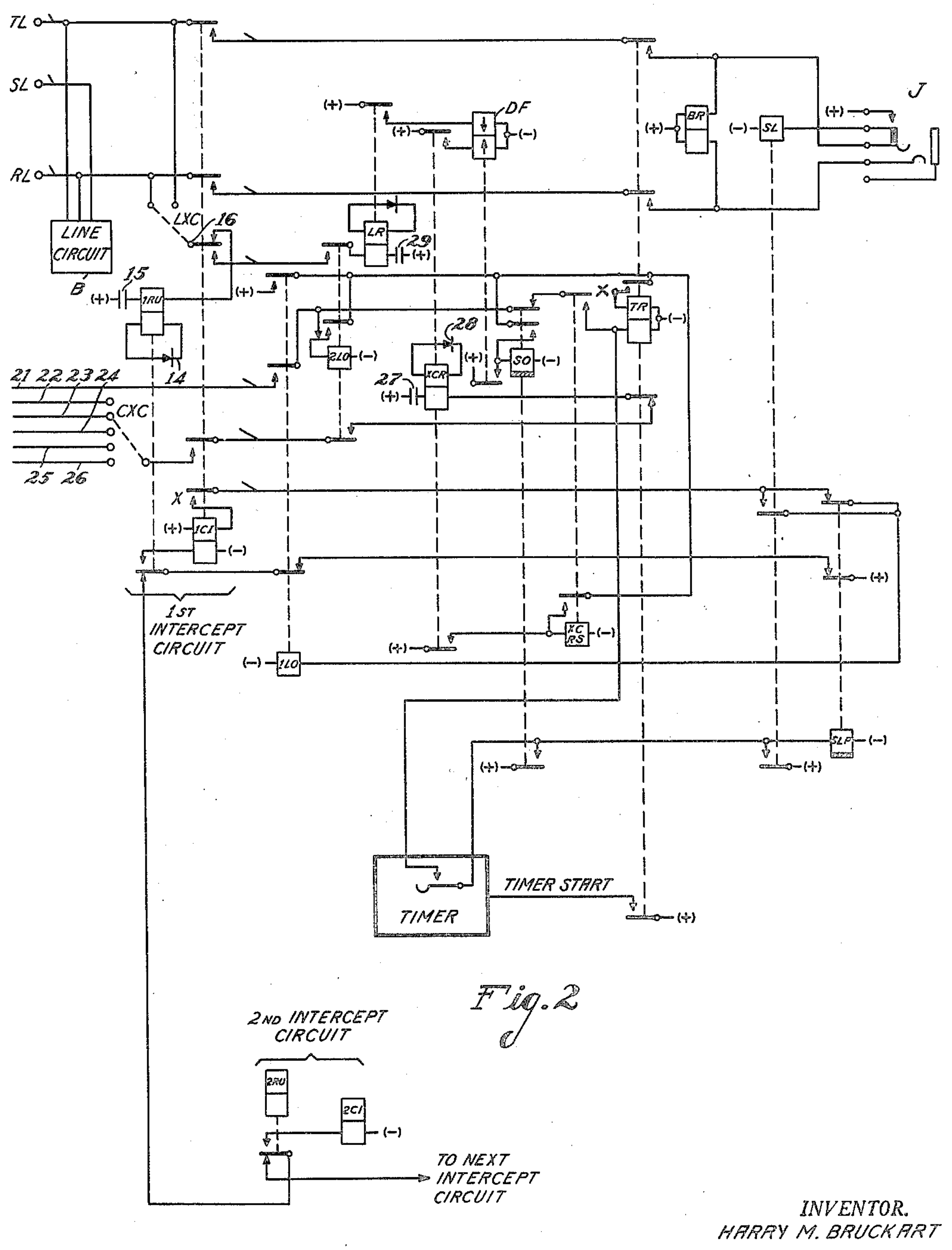

It is believed that the invention will be best understood by explaining the operation when a connection is established from a calling substation such as substation A illustrated in the upper left hand portion of Fig. 1, to a line circuit B, illustrated in the upper left hand portion of Fig. 2, assuming that the call is for the station which normally responds to the code ring applied by interrupter 21 which ring is two shorts and one long as indicated in Fig. 3. It will further be assumed that the station corresponding to this code ring is disconnected, as indicated by the cross connection of the code jumper CXC by way of conductor 23 to the common interrupter 21 and furthermore the line cross connection LXC indicates that a station connected to the ring conductor of this line is on intercept. It will be understood that cross connection LXC may be switched to the tip line conductor of the indicated line, in the event that divided circuit ringing is provided and that the station on intercept was connected to the tip side of the line. It will also be understood that cross connection CXC can be switched to any one of the common code ringing commons for marking the particular code corresponding to a particular station of the indicated line which is on intercept.

In order to more clearly explain the operation of the circuits to which the invention pertains, a portion of the equipment embodied in the connector switch has been shown in detail. More particularly, this equipment comprises a slow operate cut-in relay CI, a slow acting trip relay TR and a station selecting switch SS of the well-known minor type. In brief, switch SS comprises a single set of bank contacts cooperating with the wiper 18, this wiper being operated step by step by a stepping magnet (not shown) and released by means of a release magnet (not shown) for causing the wiper 18 to be returned to its normal or home position.

The equipment provided in the exchange for terminating line A may comprise a line switch or a line circuit and line finder, by means of which the calling line is extended to the selector, after which the selector is operated from the calling dial for selecting other selectors or connectors, of which the illustrated portion of the connector within the heavy line rectangle is one of a group to be selected by the calling line.

Line circuit 17 may be an individual or a party line, not connected for intercept service, to which a call may be extended from calling substation A. The equipment within the heavy line rectangle indicated "common interrupter" comprises a plurality of interrupter cams, or the equivalent, for cyclically switching the common ringing leads extending to the station selector bank from (+) to generator GEN for applying generator to the called line in accordance with the code selected, which code is provided by the selected interrupter. This common interrupter arrangement is preferably arranged to be started into operation when a call is extended by way of a connector, by applying (+) to the common start conductor. At the beginning of each ringing cycle a cam, or other device, associated with the common interrupter is arranged to apply (+) to the pickup conductor in any well-known manner (not shown).

The equipment provided in the intercept portion of the circuit is illustrated in Fig. 2, which shows, in block diagram, line circuit B to which the call is extended. The system further comprises a call intercepting operator's trunk circuit connected to a jack, illustrated in the upper right hand portion of Fig. 2, to which certain calls routed to certain stations of the party lines may be extended by the operation of the improved intercept apparatus illustrated in Fig. 2. It will be understood that the trunk circuit to the jack may be replaced by a tick-tick tone circuit, such as illustrated in Powell Patent 2,344,634 for audibly signaling the calling party to hang up and dial the information operator.

It is not believed necessary to disclose or explain how the line switch, line finder, selector or connector circuits are operated for extending calls originated at station A to called line circuits such as 17 of Fig. 1 or B of Fig. 2, since all of these circuits may be arranged in accordance with conventional practice.

With the above general explanation, it will now be assumed that station A extends a call to line B and that this line has its ring line conductor RL cross connected by jumper LXC to the intercept circuit and more particularly to the contact spring 16 of cut-in relay 1CI of the first intercept circuit. It will further be assumed that the station selector of the connector has its wiper 18 advanced to the second off-normal position, in response to station digit No. 2 for connecting wiper 18 to common ringing conductor 23. Furthermore, it will be assumed that the code cross connecting jumper CXC of the intercept circuit is cross connected to conductor 23, since it is assumed that the two short and one long ring code applied by way of conductor 23 to the called line corresponds to a station which has been removed from service and which should be directed to the intercept operator.

When the intercepted line circuit is seized, (+) on sleeve conductor SL of this line circuit, applied from the common pick-up interrupter by way of pickup conductor 21 and lower winding of relay CI of the connector, operates relay CI and the cut-off relay of the line circuit B, assuming that this line is at this time idle. The pulse from the pick-up interrupter operates relay CI and this relay closes a locking circuit for itself at its X contact, this X symbol indicating that this contact of relay CI makes before any of the other contacts are switched. This locking circuit is maintained until the connection is released and the operation of relay CI extends the tip and ring line conductors TL and RL of the called line by way of the tip and ring brushes TB and RB of the connector to the ringing circuit. Although not shown, the operation of relay CI usually applies direct (+) to sleeve 12 for making the called line busy and for operating its cut-off relay.

A tripping circuit is now completed so that the ringing may be tripped and the called line circuit extended through to the talking circuit of the connector by way of make contacts of trip relay TR. This trip circuit is effective during silent intervals of the ringing cycle and may be traced from (+), back contact of common interrupter 2I (or any other common interrupter which may have been selected by selector SS), conductor 23, wiper 18 in its second off-normal position, break contact of relay TR, make contact of relay CI, connector brush RB, called line RL, substation circuits, called line conductor TL, connector brush TB, make contact of relay CI, break contact and upper winding of relay TR to (—). It will be obvious that the removal of the receiver at the called station is effective to operate relay TR over this circuit during the silent interval. Whenever relay TR is operated, it closes a locking circuit for itself at its X contact, which is maintained complete until the connection is released. The locking circuits for the CI and TR relays are indicated in dotted lines, instead of being shown complete, since it is well known how these circuits are set up in accordance with conventional practice.

In the event that the called party removes the receiver during a ringing interval, then the above traced tripping circuit extends from (+), through the generator GEN, common conductor 19 and make contact of the common interrupter and thence by way of the previously described circuit to (—) at the upper winding of relay TR.

When the line circuit illustrated at B in Fig. 2 is selected and the intercepted station of this line is selected, the cut-in relay CI of the connector is operated but the trip relay is not operated by the removal of the receiver, as previously explained, since this call sends out a code for a station which is not connected to the called line.

When interrupter 2I connects the generator over the called line circuit, it is extended over conductor RL, cross connection LXC, break contact 16 of relay 1CI, upper winding of ring-up relay 1RU and condenser 15 to (+). Because the two terminals of the lower winding of relay 1RU are connected together by rectifier 14, relay 1RU is converted to an A. C. relay so that it responds, without chatter, to alternating current when the generator is applied to the called line. Relay 1RU closes a circuit for operating cut-in relay 1CI which may be traced from (+), break contact of sleeve repeater relay SLP, break contact of lock-out relay 1LO, make contact of relay 1RU and lower winding of relay 1CI to (—). Relay 1CI operates and closes a locking circuit for itself which may be traced from (+), upper winding of relay 1CI, X contact of relay 1CI (which contact makes before any other contact of this relay is operated), break contact of relay SLP and winding of relay 1LO to (—). The operation of relay 1CI opens up the operating winding of relay 1RU thus effecting the release of this latter relay.

Relay 1LO is operated in the above described locking circuit for relay 1CI and relay 1LO, at its lowermost upper break contact, opens up the above described circuit from (+) which operated relay 1CI for locking out or preventing the operation of any other CI relay in the event that some other station or intercept has its RU relay operated at this time.

The common ringing and interrupter apparatus now functions to send out the code of the selected station (in this example two short and one long rings) but, of course, since there is no station corresponding to this code on this selected line there will be no response to this code.

At the beginning of the next ringing cycle, the closure of the pick-up interrupter applies (+) to the common pick-up conductor which extends by way of conductor 21, make contact of relay 1LO, break contact and winding of relay 2LO to (—) for operating this latter relay. Relay 2LO closes a locking circuit for itself which may be traced from (+), make contact of relay 1LO, make contact and winding of relay 2LO to (—).

When the first ringing code of the cycle is applied to conductor 23, generator is extended through the station selector of the connector and cross connection LXC, make contacts of relays 1CI and 2LO, lower winding of relay LR and condenser 29 to (+). By means of the rectifier short circuiting the upper winding of relay LR, this relay is made responsive to alternating current, without the chatter, so that it operates from the ringing generator for closing an obvious circuit through the upper winding of differential relay DF to (—). It will be obvious from the above explanation and from the circuits illustrated, that this ringing circuit is completed to the lower winding of relay LR for each ringing period of the cycle, in this example, those periods of the cycle when the two short and one long rings are applied to the called line. This means that relay LR will follow the code ring applied to the called line.

At the same ringing periods of the cycle a by path circuit may be traced from the common generator, ringing interrupter 2I, conductor 23, code cross connecting jumper CXC, make contact of relay 1CI, make contact of relay 2LO, break contact of relay TR and lower winding of cross connecting ringing relay XCR to (+) by way of condenser 27. Since relay XCR has its upper winding bridged by rectifier 28, this relay is likewise rendered responsive to alternating current, without chatter, and follows the ringing code supplied by ringing interrupter 2I in synchronism with relay LR, since the latter relay follows this same code.

Relay XCR closes an obvious circuit for energizing the lower winding of relay DF each time that relay LR closes the circuit for energizing the upper winding of this relay and, since this is a differentially connected relay, it will not operate during the periods when the ringing current is applied to the called line in the present example. In other words, when the ringing code selected by the station selector of the connector for energizing the upper winding of relay DF corresponds to the ringing code to which this intercept circuit is cross connected for energizing the lower winding of relay DF, this latter relay does not operate. It will be understood that the LR and XCR relays operate during each ringing interval of the cycle.

The operation of relay XCR closes an obvious circuit for operating stick relay XCRS and this latter relay, at its lowermost make contact closes a circuit for sticking or locking this relay in its operated position, which circuit may be traced from (+), make contact of relay 1LO, make contact and winding of relay XCRS to (—).

After a ringing cycle has been completed, thus giving the LR and XCR relays a chance to maintain correspondence throughout the cycle, a circuit is closed for operating trip relay TR at the beginning of the next cycle which circuit extends from (+) on the pick-up conductor 21, make contact of relay 1LO, break contact of slow operate relay SO, make contact of relay XCRS and lower winding of relay TR to (−). Relay TR closes a locking circuit for itself at its X contacts, which contacts make before any other contact of this relay is switched, extending from (+), make contact of relay 1LO, make contact and upper winding of relay TR to (−).

The operation of relay TR extends the called line to the windings of bridging coil BR for providing a circuit for tripping the ring in the connector by operating the TR relay of this connector, this circuit extending from (+), upper winding of relay BR, make contact of relay TR, make contact of relay 1CI, tip line conductor TL, tip brush TB, make contact of relay CI, break contact and upper winding of relay TR of the connector to (−). It will be understood that this bridge circuit through the windings of relay BR is of proper value to prevent the operation of the answering bridge relay of the connector, which relay, if operated, would reverse the battery to the calling line. The operation of relay TR of the intercept circuit also opens up the circuit to the lower winding of relay XCR so that this relay will not be operated after it has served its purpose in following the code to which it is cross connected. Relay TR also applies (+) by way of the "timer start" conductor to the timer for causing this time to close its contact at predetermined intervals for releasing out the connection in the event that the operator does not answer the call within a specified time.

Although not shown, it is well understood how BR could be a relay for lighting an incoming signal lamp at the operator's position as an indication that there is an intercept call connected to the associated trunk.

When the operator answers by plugging into jack J, an obvious circuit is closed for operating sleeve relay SL at the same time that the talking circuit is connected to the called line by way of the plug and jack tip and ring contacts. The operation of relay SL closes an obvious circuit for operating its repeater relay SLP. Relay SL closes a bridge around the uppermost break contact of relay SLP, before this contact is opened by the operation of relay SLP to maintain the circuit for relays 1CI and 1LO complete as long as the plug is in the jack.

After the operator answers the call and passes along the information to the calling party regarding the intercepted station call and the calling party hangs up, the circuits are cleared out. The hanging up of the receiver at the calling station releases the originating line, selector and connector circuits, but the intercept circuit is not cleared out until the operator takes down the connection. This means that relay 1LO will be maintained operated and (+) disconnected from the chain circuit to the RU relays, to prevent the operation of another RU relay causing another intercept circuit to seize this common circuit before the operator releases the connection.

When the operator takes down the connection, the jack contact opens up and releases relay SL, which in turn effects the release of relay SLP. The release of relay SL also effects the release of relays 1CI and 1LO by opening up the locking circuit of relay 1CI and the operating circuit of relay 1LO, this circuit being maintained open for a short time interval due to the slow acting characteristics of relay SLP. When relay SLP releases and closes its outermost upper break contact, the above described operating circuit for relay 1LO and the locking circuit for relay 1CI is prepared for the next operation of the intercept equipment. The release of relay 1LO opens up the operating and locking circuits of relay 2LO, thus effecting the release of this relay. Relays TR and XCRS are released when their locking circuits are opened by the release of relay 1LO. This places the apparatus in normal condition ready for operation in connection with another call.

If it is desired to make use of the time out feature, then in the event that the operator fails to answer, in the system where the intercept trunk is extended to an operator instead of a tick-tick tone circuit, the timer contact closes a circuit for operating relay SLP after the trip relay TR has been operated from the pick-up interrupter. This effects the operation of relay SLP independent of either relay SL or relay SO, neither of which relays operate if the operator does not plug into jack J to answer the call. Consequently, the timer extends the (+) on pick-up lead 21, which is effective after relay XCRS is operated, for operating relay SLP and the latter relay being operated, with relay SL non-operated, clears out the circuit as previously described.

It will now be explained how the circuits function when the intercepted line is called and a code signal applied to this line which corresponds to a station still on the line. In other words, it will now be explained how the circuits function when this same line is selected, but the code applied to the line does not correspond to the station cross connected for intercepting the call, as determined by the point to which jumper CXC is connected.

The call goes through to a called line, such as line B of Fig. 2, in the previously described manner. In order to explain how the circuits function when a station is selected associated with this line, which station is not on intercept, it will be assumed that jumper CXC is connected as shown and that the station selector SS of the connector takes four steps to select the short, long, short code for application to the called line.

Ring-up relay 1RU is operated for operating and locking relay 1CI, and relay 1LO is operated, all of this taking place at the beginning of the transmission of the first generator signal of the code as before. Now when the pick-up interrupter is closed, at the beginning of the next cycle, relay 2LO is operated and locked as before.

The ringing current applied to the called line in accordance with this assumed code operates line ringing relay LR in correspondence with this code for energizing the upper winding of relay DF. Since it is assumed that cross connection jumper CXC is connected to conductor 23, to which interrupter 21 applies a short, a short and a long ring to the called line, it will be noted that there is an interval during the ringing cycle (sixth interval of Fig. 3) during which ringing current is applied to the line for operating relay LR and during which there is no ringing current applied to conductor 23 and jumper CXC to relay XCR. Consequently, relay LR is operated and relay XCR is not operated during this interval with the result that relay DF is operated because only its upper winding is energized. The operation of relay DF closes a circuit for operating relay SO and this relay closes a locking circuit for itself extending from (+), make contact of relay 1LO, make contact and winding of relay SO to (−). Relay SLP is now operated over a circuit extending from (+), make contact of relay SO and winding of relay SLP to (−). The operation of relay SLP opens up and releases relays 1CI and 1LO. The release of relay 1LO opens the above locking circuit for relay SO but this relay is not yet released because relay DF is still energized from relay LR which is maintained operated until the end of the ringing period. When this ringing period is terminated, relay LR is released for releasing relay DF, which in turn opens up and releases relay SO. The release of relay SO opens up and releases relay SLP, thus placing the intercept circuits in normal condition for response to the next code, without extending the call to the intercept operator.

In this particular arrangement. the ring-up and cut-in relays, such as relay 1RU and 1CI, are operated as long as ringing current is applied to this intercepted line, and the LR, DF. SO and SLP relays function as before to prevent the connection of this call to the intercept operator's trunk circuit. Of course, when the called party answers, ringing is terminated on this line, and since the RU relay will not then operate, the previously described relay operations of the intercept circuit are not repeated.

It is believed that the above explanation is sufficient to indicate how the circuits function to intercept a call when cross connecting jumper CXC of an intercepted called line is cross connected to the ringing code conductor which corresponds to the ringing code applied to the called line and how the circuits function to prevent the connection of a call to the intercept operator if jumper CXC is cross connected to a conductor representing a code which is out of correspondence with the code applied to the called line.

Having described an intercept system as particularly adaptable for selective type communication service in party line ringing systems of the code type, it is desired to have it understood that this form is selected to facilitate in the disclosure of the invention rather than to limit the number of forms which it may assume; and it is to be further understood that various modifications, adaptations and alterations may be applied to the specific form shown to meet the requirements of practice, without in any manner departing from the spirit or scope of the present invention except as limited by the appended claims.

What I claim is:

1. In a telephone system including a line and ringing apparatus for impressing station signaling ringing voltage on the line during any one of a plurality of time intervals, an intercept circuit connected to said line, means in said intercept circuit responsive to said station signaling ringing voltage, means for applying intercept signaling ringing voltage to said intercept circuit during certain of said time intervals, means in said intercept circuit responsive to said intercept sigaling ringing voltage, differential relay means responsive to correspondence between said station signaling ringing voltage and said intercept signaling ringing voltage during said certain time intervals, and means including said differential relay means for routing a call intended for said line to an operator's position.

2. In a telephone system including a line and ringing apparatus for impressing station signaling ringing voltage on the line during any one of a plurality of time intervals, an intercept circuit connected to said line, means in said intercept circuit responsive to said station signaling ringing voltage, means for applying intercept signaling ringing voltage to said intercept circuit independent of said line during certain of said time intervals, means in said intercept circuit responsive to said intercept signaling ringing voltage, differential relay means responsive to correspondence between said station signaling ringing voltage and said intercept signaling ringing voltage during said certain time intervals, and means including said differential relay means for routing a call intended for said line to an operator's position.

3. In a telephone system, a multi-party line, a call intercepting circuit, ringing apparatus for providing different ringing signals designating different stations on said line, means including a line selecting device for transmitting any one of said ringing signals over said line, means exclusive of said line selecting device for transmitting any one of said different ringing signals to said intercepting circuit concurrently with the transmission of said one of said ringing signals over said line, differential relay means jointly controlled by said ringing signals transmitted over said line and to said intercepting circuit, and means including said differentail relay means for causing said intercepting circuit to intercept a call to said line.

4. In a telephone system, a multi-party line, a call intercepting circuit, ringing apparatus for providing different coded ringing signals designating different stations on said line, means for transmitting any one of said coded ringing signals over said line, means for transmitting said one of said different coded ringing signals to said intercepting circuit concurrently with the transmission of any one of said coded ringing signals over said line, differential relay means jointly controlled by said coded ringing signals transmitted over said line and to said intercepting circuit, and means including said differential relay means for causing said intercepting circuit to intercept a call to said line.

5. In a telephone system, a multi-party line, a call intercepting circuit, ringing apparatus for providing different coded ringing signals designating different stations on said line, means for transmitting any one of said coded ringing signals over said line, means for transmitting any one of said different coded ringing signals to said intercepting circuit concurrently with the transmission of said one of said coded ringing signals over said line, differential relay means jointly controlled by said coded ringing signals transmitted over said line and to said intercepting circuit, and means including differential relay means for causing said intercepting circuit to intercept a call to said line and to route said call to an operator's postiion.

6. In a telephone system, a calling line, a called party line, means including a line selecting device for establishing a connection from said calling line to said called line and for transmitting any one of a plurality of distinctive ringing signals to said party line for signaling any one of the parties thereon, an intercept trunk operatively connected to said party line, a first signal responsive means operatively connected to said intercept trunk responsive to said distinctive ringing signals, cross connecting means operatively connected to said intercept trunk for selectively by-passing any one of said plurality of distinctive ringing signals to said intercept trunk over a path exclusive of said line selecting device, differential relay means responsive to a correspondence condition between any one of said signals transmitted to said party line and any one of said by-passed signals, and means including said differential relay means for intercepting a call to said party line.

7. In an automatic telephone system, a plurality of multi-party lines, ringing apparatus including a plurality of ringing interrupters for providing cycles of ringing voltages of different station selecting characteristics, automatic switching apparatus having access to said lines and including means for selectively impressing ringing voltage of any one of said characteristics upon any one of said lines, an operator's position, an intercept circuit connected to one of said lines, means for impressing ringing voltage of any one of said characteristics upon said intercept circuit by way of a first path including said automatic switching apparatus during one of said cycles, means for impressing ringing voltage of any one of said characteristics upon said intercept circuit by way of a second path exclusive of said automatic switching apparatus during said one cycle, and differential relay means jointly controlled over said first and said second paths for extending a call for a particular party on one of said multi-party lines to said operator's position.

8. In a telephone system, a plurality of party lines, a connector for connecting with any one of said party lines, a ringing generator and an interrupter supplying a plurality of distinctive ringing signals to said connector, an intercept circuit for connecting to any one of said party lines, a first signal responsive means, a second signal responsive means, a differential relay connected in said intercept circuit, means for controlling the energization of one of the windings of said differential relay by said first signal responsive means, means for controlling the energization of another of the windings of said differential relay by said second signal responsive means, means in said connector for selectively applying any one of said plurality of distinctive ringing signals to any one of said party lines and to said first signal responsive means, a by-path circuit, means for applying any one of said plurality of distinctive ringing signals by way of said by-path circuit to said second signal responsive means, and means controlled by a correspondence condition between the said ringing signals applied to said first and said second signal responsive means whereby the operation of said differential relay is prevented for causing said intercept circuit to intercept a call to the party line to which said intercept circuit is connected.

9. In a telephone system, a plurality of party lines, a connector for connecting with any one of said party lines, a ringing generator and an interrupter supplying a plurality of coded ringing signals to said connector, an intercept circuit for connecting to any one of said party lines, a first signal responsive means, a second signal responsive means, a differential relay connected in said intercept circuit, means for controlling the energization of one of the windings of said differential relay by said first signal responsive means, means for controlling the energization of another of the windings of said differential relay by said second signal responsive means, means in said connector for selectively applying any one of said plurality of coded ringing signals to any one of said party lines and to said first signal responsive means, a by-path circuit, means for applying any one of said plurality of coded ringing signals by way of said by-path circuit to said second signal responsive means, and means controlled by a correspondence condition between the said ringing signals applied to said first and said second signal responsive means whereby the operation of said differential relay is prevented for causing said intercept circuit to intercept a call to the party line to which said intercept circuit is connected.

10. In a telephone system, a plurality of party lines, a connector for connecting with any one of said party lines, a ringing generator and an interrupter supplying a plurality of coded ringing signals to said connector, an intercept circuit for connecting to any one of said party lines, a first signal responsive means, a second signal responsive means, a differential relay connected in said intercept circuit, means for controlling the energization of one of the windings of said differential relay by said first signal responsive means, means for controlling the energization of another of the windings of said differential relay by said second signal responsive means, means in said connector for selectively applying any one of said plurality of coded ringing signals to any one of said party lines and to said first signal responsive means, a by-path circuit, means for applying any one of said plurality of coded ringing signals by way of said by-path circuit to said second signal responsive means, and means controlled by a correspondence condition between the said ringing signals applied to said first and said second signal responsive means whereby the operation of said differential relay is prevented for causing said intercept circuit to intercept a call to the party line to which said intercept circuit is connected and to extend said call to an operator's position.

11. In a telephone system, a plurality of party lines, a connector for connecting with any one of said party lines, an intercept circuit for connecting to any one of said party lines, a double wound differential relay connected in said intercept circuit, means in said connector for selectively applying any one of a plurality of distinctive ringing signal codes to any one of said party lines, means for applying a first replica of said distinctive ringing signal codes to one winding of said differential relay, a by-path circuit, means for applying a second replica of said distinctive ringing signal codes by way of said by-path circuit to the other winding of said differential relay, and means controlled by a correspondence condition between said first and second replicas applied to both windings of said differential relay for causing said intercept circuit to intercept a call to the party line to which said intercept circuit is connected.

12. In a telephone system, a plurality of party lines, a connector for connecting with any one of said party lines, an intercept circuit for connecting to any one of said party lines, a double wound differential relay connected in said intercept circuit, means in said connector for selectively applying any one of a plurality of distinctive ringing signal codes to any one of said party lines, means for applying a first replica of said distinctive ringing signal codes to one winding of said differential relay, a by-path circuit, means for applying a second replica of said distinctive ringing signal codes by way of a said by-path circuit to the other winding of said differential relay, and means controlled by a correspondence condition between said first and second replicas applied to both windings of said differential relay for causing said intercept circuit to intercept a call to the party line to which said intercept circuit is connected and to extend said call to an operator's position.

HARRY M. BRUCKART.

REFERENCES CITED

The following references are of record in the file of this patent:

UNITED STATES PATENTS

| Number | Name | Date |
|---|---|---|
| 1,601,052 | Williams | Sept. 28, 1926 |
| 2,208,924 | Davidson | July 23, 1940 |
| 2,224,497 | Wright | Dec. 10, 1940 |
| 2,224,517 | Kessler | Dec. 10, 1940 |
| 2,258,660 | Peterson | Oct. 14, 1941 |
| 2,268,424 | Ryan | Dec. 30, 1941 |
| 2,285,282 | Jones | June 2, 1942 |
| 2,300,186 | Wallace | Oct. 27, 1942 |
| 2,344,634 | Powell | Mar. 21, 1944 |
| 2,379,456 | Rhoads | July 3, 1945 |

Certificate of Correction

Patent No. 2,542,749

February 20, 1951

HARRY M. BRUCKART

It is hereby certified that error appears in the printed specification of the above numbered patent requiring correction as follows:

Column 6, line 2, for the word "or" read *on*;

and that the said Letters Patent should be read as corrected above, so that the same may conform to the record of the case in the Patent Office.

Signed and sealed this 7th day of August, A. D. 1951.

[SEAL]

THOMAS F. MURPHY,